United States Patent

Maly et al.

[11] 4,110,158
[45] Aug. 29, 1978

[54] CORE REACTOR AND METHOD OF OPERATING SAME

[75] Inventors: Vladimir Maly; Eberhard Teuchert, both of Jülich, Fed. Rep. of Germany

[73] Assignee: Kernforschungsanlage Jülich Gesellschaft mit beschränkter Haftung, Jülich, Fed. Rep. of Germany

[21] Appl. No.: 733,698

[22] Filed: Oct. 19, 1976

Related U.S. Application Data

[63] Continuation of Ser. No. 508,407, Sep. 23, 1974.

[30] Foreign Application Priority Data

Sep. 22, 1973 [DE] Fed. Rep. of Germany ....... 2347817

[51] Int. Cl.² ............................................. G21C 15/02
[52] U.S. Cl. .................................. 176/58 PB; 176/30
[58] Field of Search ..................... 176/22, 30, 33, 37, 176/38, 58 PB, 86 R, 17, 18, 46; 117/65

[56] References Cited

U.S. PATENT DOCUMENTS

| | | | |
|---|---|---|---|
| 2,809,931 | 10/1957 | Daniels | 176/37 |
| 2,812,303 | 11/1957 | Daniels | 176/30 |
| 2,872,399 | 2/1959 | Newson | 176/17 |
| 2,910,379 | 10/1959 | Gurinsky et al. | 117/65 |
| 3,050,454 | 8/1962 | Barr et al. | 176/46 |
| 3,321,371 | 5/1967 | Kambara et al. | 176/33 |
| 3,519,536 | 7/1970 | Rausch | 176/58 PB |

*Primary Examiner*—Samuel W. Engle
*Assistant Examiner*—S. A. Cangialosi
*Attorney, Agent, or Firm*—Walter Becker

[57] ABSTRACT

A core reactor and method of operating same, according to which fuel elements, preferably of ball shape, are provided with an envelope of graphite and are passed in downward direction through reflector means of graphite which is simultaneously passed through by a heat transfer means and includes a ceiling reflector, a side reflector and a bottom reflector so that the fuel elements after once passing through the reactor core have reached the desired end burn-off conditions. Within or in the vicinity of that portion of the wall of the ceiling reflector and/or of the upper portion of the wall of the side reflector there are provided neutrons absorbing substances or additional substances reducing the speed of the neutrons.

7 Claims, 3 Drawing Figures

CORE REACTOR AND METHOD OF OPERATING SAME

This is a continuation of application Ser. No. 508,407, filed Sept. 23, 1974.

The present invention relates to a core reactor in which fuel elements provided with a cover of graphite, preferably of ball shape, are from above passed downwardly through the reflector which is passed through by a heat transfer substance and is formed primarily by a fill of ball-shaped fuel elements, the reactor core being surrounded by a reflector structure of graphite which comprises a ceiling reflector, a side reflector and a bottom reflector. The arrangement is such that the fuel elements after having once passed through the reactor core reach the desired final burning-off loss. The present invention furthermore comprises a method for operating said reactor.

Core reactors which are continuously charged with ball-shaped fuel elements and after the burning-off are withdrawn from the reactor, and with which the fuel elements are present in the reactor as a fill of said ball-shaped elements pertain to the state of the art. In reactors of this type which are designated as ball fill reactors, the fill of the fuel elements during the operation is located in a cylindrical container, the walls of which are lined with a layer of graphite having a thickness of approximately 1 meter. The graphite layer which serves for reducing the speed of the fast neutrons freed during the fission of the fuel is designated as reflector or reflector structure. According to a very advantageous way of operating this reactor, the charging is effected in such a way that the fuel elements will during a single passage through the reactor core reach their aimed burn-off. As a result thereof, there is obtained a profile of the power density distribution which over the height of the reactor drops from above in downward direction. This has the advantage that the heat transfer onto the cooling gas which with this operation flows downwardly through the reactor, is an optimum. In addition thereto, this has the advantage that in spite of taking account of the limitations which are to be fixed in view of various technological aspects, at the intermediate power density between 9 and 12 MW/m$^3$ there will be obtainable a mean gas exit temperature of approximately 1000° C.

It is, however, disadvantageous that the graphite of the reflector surrounding the reactor core will be damaged in view of the fast neutrons acting upon said graphite while the energy range of said fast neutrons varies from $10^5$ to $10^7$ eV. With increasing neutron dose, first shrinking occurs and subsequently swelling and brittling of the graphite of the reflector. This damaging action occurs all the faster the higher the temperature during the radiation. In order to avoid this, heretofore the admissible fast dose of approximately $4.7 \times 10^{22}$ cm$^{-2}$ was not to be exceeded. Since, however, the admissible load of the fuel elements emits an increase in the mean power density up to 15 MW/m$^3$ this represented an undesired limitation of the power density. This power limitation at which thus the graphite of the reactor is not yet endangered, was located heretofore within the region of from 7 to 10 MW/m$^3$.

It is, therefore an object of this invention to provide the possibility of increasing at the same lifespan the mean power density and thus the total output of a core reactor which, as mentioned above, is charged with ball-shaped fuel elements.

The invention is based on the finding that it is decisive to prevent the fast dosing in those regions of the reflector which are under the greatest load. The invention is furthermore based on the finding that in particular the inner border layers of the ceiling reflector and the upper parts of the side reflector are exposed to a high dose load. The invention is based on the further finding that while the lower regions of the reflector are exposed to a lower dose, this will bring about a reduction in the reactor output when it is provided to heat the cooling gas passing through the reactor core to a temperature above 850° C, and when the stress of the employed substances is brought about by the high temperatures is not sufficiently taken into consideration.

The above outlined object has been realized with a core reactor of the above mentioned general type by providing within or in the vicinity of that portion of the wall of the ceiling reflector which faces the fuel element filling and/or of the upper portion of the wall of the side reflector, substances which absorb or reduce neutrons or the neutron speed. In this way, it will be realized that in the dose endangered regions of the reflector, the fast neutrons flow is considerably reduced. Depending to what extent the steps according to the invention are employed, the neutron flow can in the above mentioned manner be reduced in ranges between 30 and 40% or if necessary between 20 and 80%. This brings about that also the dose damage is reduced to the same extent so that it will be possible without difficulties correspondingly to increase the power density of the reactor. A very advantageous further development of the core reactor according to the invention consists in that in the wall of the ceiling reflector and/or in the upper portion of the wall in the side reflector there are embedded coated particles which contain neutron absorbing substances such as boron, hafnium or the like and which have a diameter of a few hundred $\mu$m. Another advantageous step which may be employed instead or in addition thereto consists in that in the wall of the ceiling reflector and/or in the upper portion of the wall in the side reflector bores, cavities or the like are provided in which rods are arranged which contain neutron absorbing substances such as boron, hafnium or the like. Due to the absorption of neutrons within the reflector in view of the last mentioned steps, the thermal neutron flow in the ball fill is descreased up to a distance of approximately 80 cm from the wall of the reflector. This brings about that in view of the inherent decrease in the rate of fission, the inflow of fast neutrons onto the border surface of the reflector region in which these steps are carried out is decreased up to 80% depending on the dosing with neutron absorbing substances. If required, it may also be advantageous to carry out a dose relief in the lower portion of the reflector if very high gas exit temperatures are desired and in particular if dose endangered substances are employed. Instead of adding absorption material in coated form, it is naturally also possible to dose the reflector wall within the mentioned ranges in a different way for instance in granular form without coating. In addition to boron and hafnium, also other suitable substances may be used as absorbing substances such as manganese, iron, nickel and gadolinium; also mixtures of adsorbing materials adapted to the respective requirement may be employed. In this connection, it may be mentioned that advantage may be taken of the fact that these substances have different effective cross sections and that the concentration of manganese, iron and nickel will not materially change during the operation of a reactor over a decade. Boron, gardolinium, and hafnium have a highly effective adsorption cross section. Therefore, they need be added only in small concentrations. Since, however, they are burnable, they have to be renewed in intervals of a few years. The embedding or incorporation of adsorption materials in the reflector wall brings about that the temperature of the helium which in this part of the reflector flows along the reflector wall will be lower by from 100° to 150° C without embedding or incorporating in the wall of the reflector substances which absorb the neutrons. This brings about a considerable increase in the lifespan of the reflector. Due to this step, the power density is furthermore displaced into inner regions of the reactor core. As a result thereof, the accumulating fast neutron dose upon the reflector limit surface which occurs during the duration of the reactor operation will be reduced. A further step of increasing the power of a core reactor by means of a fill of ball-shaped fuel elements consists in that the reactor is charged from above with substances which absorb neutrons only over a predetermined distance and/or is charged with substances of ball-shaped elements which contain the neutron speed reducing materials. Already a minor addition of boron to the fuel elements and a charging with fuel elements in such a way that a distribution of the so doped fuel elements occurs over the entire ball-pouring surface has a similar effect as the embedding or incorporation of boron in the ceiling reflector. A further very advantageous step according to the invention which may be employed instead or in addition thereto consists in that the ball-shaped elements which contain substances that absorb neutrons and/or reduce the neutron speed are conveyed to the reactor core in a marginal zone which has a width of from 20 to 40cm and borders the side reflector. In this instance it may be expedient to add hafnium, boron or the like as absorber to the fuel element balls which are introduced into the charge from the side. To fuel element balls which are charged into the reactor in the vicinity of the side wall expediently slowly burning-off absorbers are added. Also in this instance, the absorption substances are contained in elements in which also the fuel is contained or may be contained in separate elements. The addition of substances which absorb neutrons may be effected by doping ball-shaped fuel elements containing the fuel or may be effected in separate ball-shaped elements. The charging of elements which contain substances adapted to burn-off and absorbing neutrons is particularly advantageous when the step is carried out in the upper half of the reflector and preferably in the upper third of the reflector.

Instead of employing burnable absorption substances, it has also proved advantageous to employ as neutron absorbing substance a plutonium isotope mixture with a high proportion of $^{240}$Pu. This is advantageous for the reason that in the neutron spectrum present during the operation of the core reactor, the $^{240}$Pu has a very high absorption cross section. It therefore behaves practically like a burnable poison. In addition thereto the employment of the plutonium isotope $^{240}$Pu has the advantage that due to the neutron catch, it turns into the isotope $^{241}$Pu. Inasmuch as this is a fission material, a very economical manner of operation of the reactor is realized. Since, furthermore, the formation of fission material of the ball-shaped fuel elements takes place in the lower regions of the reactor core, it will be made possible in spite of low charge of fission material in the elements, to obtain a power density which corresponds to a higher charge of fission material.

Since the $^{240}$Pu usually occurs in mixtures of the isotope $^{239}$Pu + $^{240}$Pu + $^{241}$Pu + $^{242}$Pu, it will be appreciated that when employing a plutonium mixture, there is superimposed a build-up of $^{240}$Pu which occurs in the meantime and which is derived from neutron catches in $^{239}$Pu. The practical effect is that the burning-off of $^{240}$Pu is delayed. If the plutonium mixture is charged into the reactor from the side wall of the reflector in a combination corresponding to the specific requirements, it is possible in a simple manner to obtain a dose relief of the lateral reflector in the entire upper third thereof. It has been found that depending on the quantity of the charged plutonium, the fast dose can be reduced by from 20 to 60%.

A further very advantageous step according to the invention consists in that as neutron absorbing substance there is employed $^{232}$Th. Also in this way it will be realized that in the upper portion of the reactor, neutrons are caught and that in the lower part the breeding effect of $^{232}$Th is taken advantage of. The effective cross section of $^{232}$Th is relatively low so that the $^{232}$Th burns off only to a minor extent, i.e., up to 10%. By employing $^{232}$Th, only a slight reduction in the thermal neutron flow in the upper portion of the reflector is obtainable. The advantage of this step, however, is seen in the reduction of the concentration of the fission material in the upper portion of the reactor core so that also due to this step, the output density in the upper region of the reflector and a displacement to the lower region will be obtained. This likewise results in a dose relief of the upper reflector range. According to the invention it is expedient to enrich the fuel elements with $^{232}$Th in such a way that the mean proportion in $^{232}$Th with regard to the total quantity of the employed fuel elements in the core reactor amounts to from 15 to 30 grams per each ball-shaped fuel element. This means that the $^{232}$Th content in the marginal zones of the fuel element filling is about from 20 to 30% higher than in the middle region of the filling.

The steps according to the invention can according to a very advantageous modification of the method of operating a core reactor be further effectively aided in conformity with the invention by adding in the reactor core, especially in the upper portion of the regions adjacent to the reactor walls, elements which include an increased proportion of those substances which reduce the neutron speed, which means having a lower proportion in fuel or no fuel at all and having a higher proportion in a substance which reduces the neutron speed, in other words, graphite. This may in case of requirement bring about that pure graphite balls are added. In this way, a special displacement of the output density is obtained in such a manner that the output density is reduced over the entire height of the marginal zone. This results in this region in a reduction of the heating-up of the cooling gas. In addition to the thereby obtained reduction in temperature in the vicinity of the reflector wall, simultaneously also a reduction in the neutron dose is realized. This step, however, is applied primarily in addition to the remaining steps according to the invention. The advantage of the further development of the core reactor according to the invention and of the method of the invention for operating the reactor consists in the simplicity and in the high adaptability to the respective prevailing conditions. Therefore, within the course of the reactor operation, it is possible without difficulties precisely to adapt these steps to varying conditions.

Thus, it is possible for instance to change the way of charging the reactor in such a way that the maximum influence of the fast flow upon the mantle reflector will during the first 5 to 10 years of operation of the reactor occur below the central plane of the reactor and that in the further course the maximum influence of the fast flow upon the mantle reflector will be displaced to the upper quarter of the reactor. In this way, the uniform distribution of the dose upon the mantle reflector will be made possible. Since this displacement is based practically on a displacement of the power generation, it follows that during the first years of operation the fast dose will act in the upper portion of the reflector at relatively low temperatures so that damage of the graphite of the reflector will be very low during the fast time period. Thereupon in the following time period of operation a partial healing out of possibly occurred radiation damage will at a low flow and high temperature be favored in the lower portion of the reflector. The steps according to the invention can be aided by correspondingly taking advantage of and/or by additionally providing absorber rods controlling the reactor operation.

The invention will appear more clearly from the following specification in connection with the accompanying drawing, in which.

Figure 1:
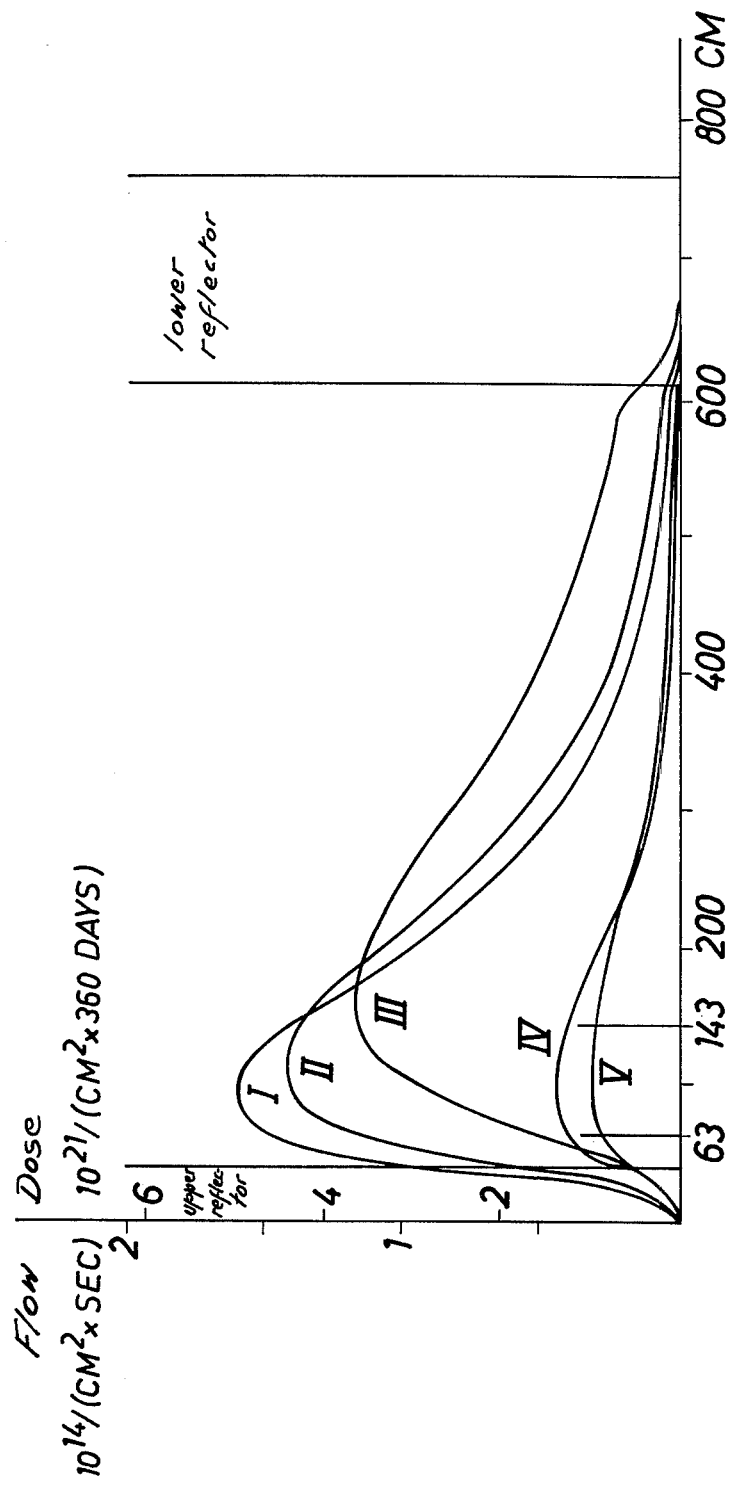
FIG. 1 illustrates by way of a graph the different sections due to the employment of the steps according to the invention upon the fast neutron flow along the reactor axis and upon the fast neutron flow and the fast year dose along the border surface between the reactor core and the mantle reflector.

The neutron flow illustrated in FIG. 1 concerns a core reactor with one-zone-core with which the fuel elements are continuously added in ball-shaped form and are withdrawn and are present in the reactor in the form of a ball fill. The power density of the reactor amounts to $5MW/m^3$, the curve designated I illustrates the fast neutron flow along the reactor axis. If in the upper portion of the reflector a thermal absorber was provided the total effective cross section of which is $\Sigma_a = 0.0016$ cm$^{-1}$, the thermal flow and thus the power density is displaced into the lower region of the reactor core. The fast flow of the neutrons occurs along a path indicated by the curve II. The fast dose at the inner rim of the upper reflector was reduced by 28%. The criticality of the balance operation occurring in connection therewith was likewise reduced but merely by 0.4%. An equalization could be effected without difficulties by increasing the initial enrichment from 6.50% to 6.60%. If the effective cross section of the absorber was increased in the upper portion of the reflector up to a complete blackening, the neutron flow adopted the form illustrated by the curve III. The neutron flow was reduced in the border surface by 82%. Curve IV illustrates the fast neutron flow along the border surface between the reactor core and the side reflector without employing steps according to the invention. The course of curve V shows the displacement of the power density at a slight poisoning of the side reflector over a width of approximately 80cm at the upper rim of the ball fill. The effective cross section $\Sigma_a$ amounted in this instance to 0.0016 cm$^{-1}$. As will be evident from the course of the curves, the power density in the reactor core was by employing the steps according to the invention displaced in such a way that the fast dose was reduced in the above mentioned region by approximately 30%.

In order to obtain an effective cross section $\Sigma_a = 0.0016$ cm$^{-1}$, manganese with a volume proportion of 0.15% was added to the graphite of the reflector. An admixture of 0.72% by volume of 0.72% by volume of Fe or 0.38% by volume of Ni corresponds to said addition of manganese.

Figure 2:
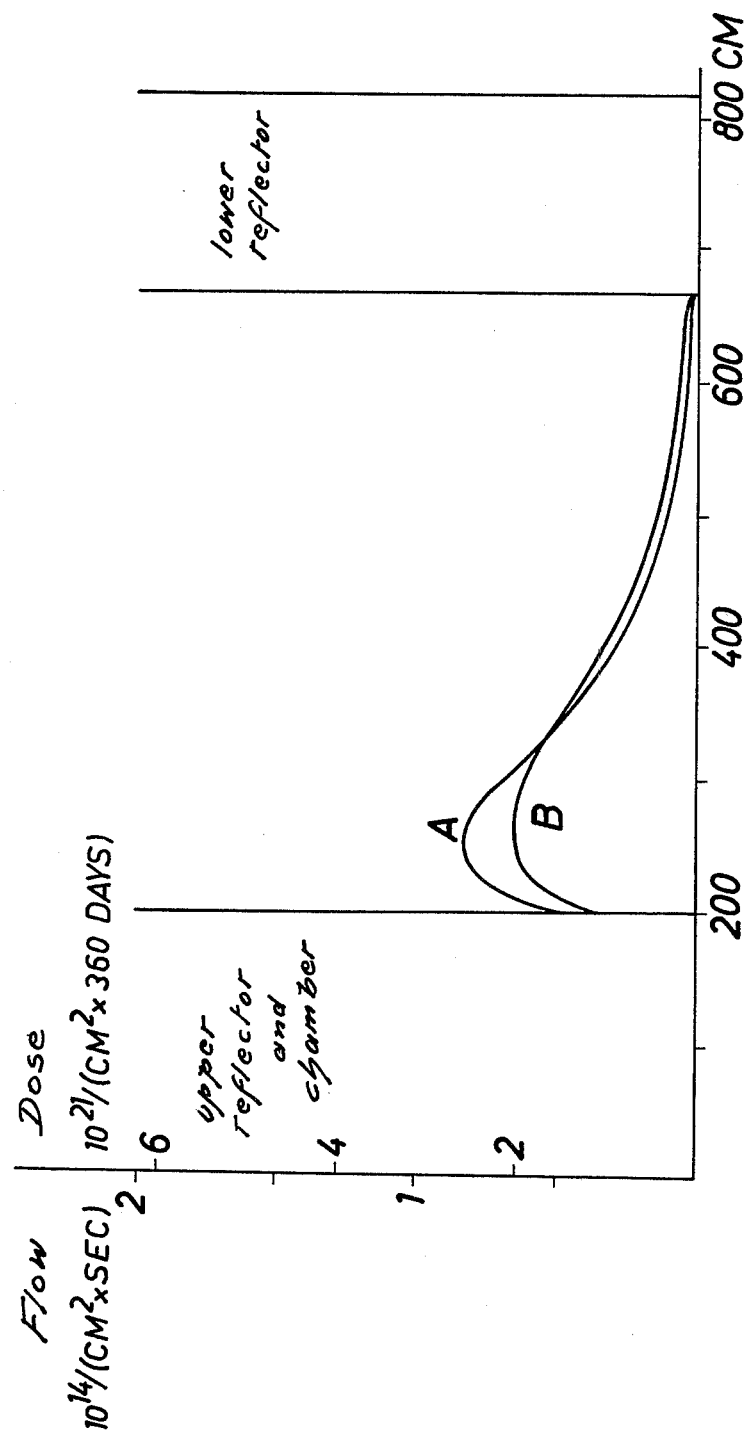
FIG. 2 illustrates the fast neutron flow and the yearly dose along the inner limitations of the side reflector.

The relations illustrated in FIG. 2 have been ascertained for a core reactor with a two-zone core in which the fuel elements are continuously added in ball-shaped form and are withdrawn and occur in the reactor as ball fill. The power density of the reactor amounts to $3MW/m^3$. The charge of the marginal zone of the ball fill adjacent the side reflector, with which the fast neutron dose on the reflector surface over the reactor length corresponds to the course of the curve designated with the letter "A" contained per 100 balls 1,360 grams of $^{232}$Th and 158 grams $^{235}$U. With the charge no pure graphite balls were added. The content of fast material in the balls itself was reduced. The balls contained each 18.9 grams of $^{232}$Th and 1.2 grams of $^{235}$U. As will be evident from FIG. 2, on an average the fast neutron dose was reduced by 24% in the upper third of the reflector due to the steps referred to in connection with the course of the curve B. The fast neutron dose increased slightly in view of the increased breeding effect in the lower region of the reflector. This, however, can be tolerated without difficulties because in the region the technologically admissible limit was not reached anyhow. The preference of employing the steps according to the invention is also evident from the fact that the costs for the fuel cycle are practically the same as was the case when the steps were not employed.

Figure 3:
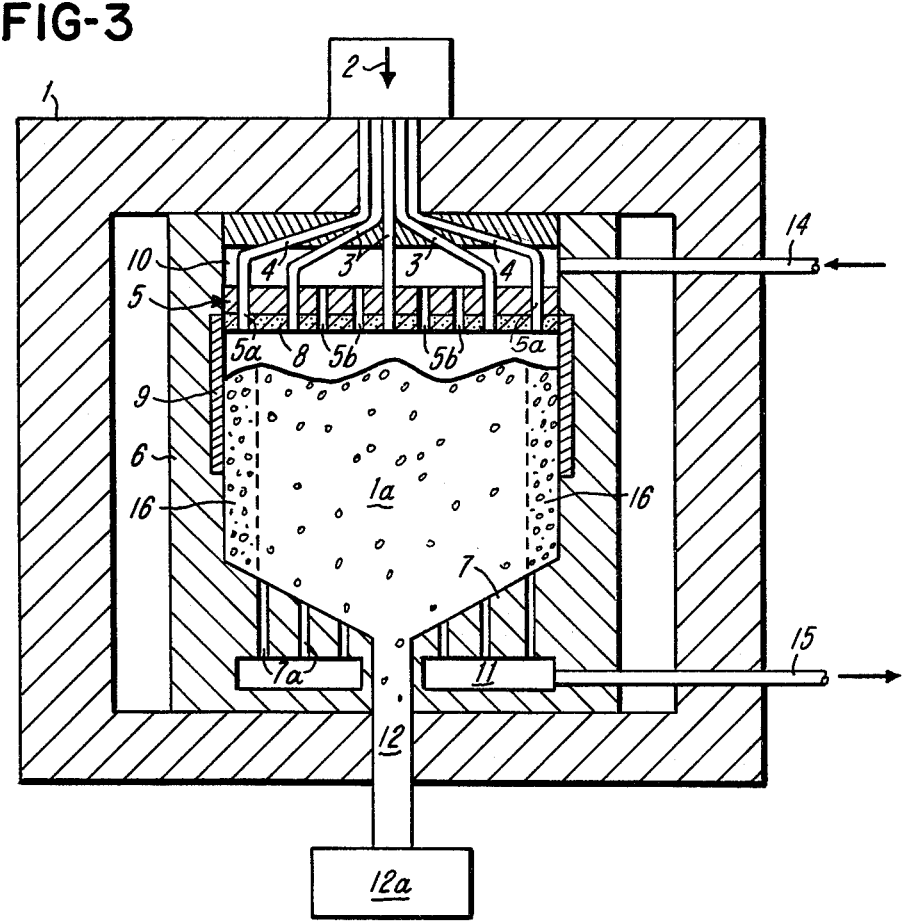
FIG. 3 is a diagrammatical representation of a core reactor according to the present invention.

Referring now to FIG. 3 of the drawings, this figure shows a core reactor pressure container 1 according to the invention, which contains a fuel fill 1a charged from the above into the container 1 in the direction indicated by the arrow 2. The reactor pressure container 1 is provided with feeding tubes 3 for customary fuel elements and is furthermore provided with feeding tubes 4 for such fuel elements which additionally contain neutrons absorbing substances and substances which reduce the speed of neutrons.

Also provided in said reactor pressure container 1 is a reflector structure which comprises a ceiling reactor 5 with passages 5a for introducing fuel elements therethrough and with openings 5b for the passage of cooling gas introduced through the inlet conduit 14. The cooling gas admitted through conduit 14 first enters an upper cooling gas collecting chamber 10 and then passes through said passages 5b. The reflector structure furthermore comprises a side reflector 6 and a bottom reflector 7 with passages 7a for passing the cooling gas therethrough which is discharged into the lower cooling gas collecting chamber 11 and from there through conduit 15. A portion 8 of the ceiling reflector 5 has embedded therein neutrons absorbing substances in the form of shell granulars or small rods.

The reactor pressure container 1 also includes a fuel elements withdrawing pipe 12 and a storage device 12a for fuel elements.

Finally, it should be noted that the outer marginal zone 16 of the preferably ball-shaped fill 1a contains fuel elements which contain neutrons absorbing substances and/or substances reducing the speed of the neutrons.

It is, of course, to be understood that the present invention is, by no means, limited to the specific showing in the drawings but also comprises any modifications within the scope of the appended claims.

What we claim is:

1. A gas-cooled nuclear reactor comprising
   (a) a generally cylindrical container,
   (b) a layer of graphite approximately one meter in thickness lining the inside walls of the container and forming a ceiling reflector, a side reflector and a bottom reflector, the graphite reflectors encompassing a single reaction chamber,
   (c) means introducing a cooling gas through the ceiling reflector into the reaction chamber and withdrawing the gas from the reaction chamber through the bottom reflector for maintaining the reaction chamber at a desired operating temperature,
   (d) a first multitude of ball-shaped elements substantially filling the reaction chamber, the multitude of ball-shaped elements comprising an advantageous mixture of fissionable material, fertile material and moderator material which will sustain a nuclear reaction,
   (e) a second multitude of ball-shaped elements containing a higher concentration of neutron absorbing substance than is contained by said first multitude of ball-shaped elements in the reaction chamber, said neutron absorbing substance being selected from the group consisting of; boron, Gadolinium, Hafnium, Iron, Manganese, Nickel, Plutonium and Thorium,
   (f) a plurality of passages through the ceiling reflector for introducing additional ball-shaped elements into the reaction chamber and at least one passage through the bottom reflector for withdrawing ball-shaped elements from the reaction chamber, the ball-shaped elements being introduced through the ceiling reflector and withdrawn through the bottom reflector a such a rate as to maintain said nuclear chain reaction,
   (g) at least two sets of feeding means connected to said plurality of passages through the ceiling reflector for feeding said ball-shaped elements through the passages into the reaction chamber, a first of the two sets of feeding means being arranged to only feed said second multitude of ball-shaped elements to an outer marginal zone of the reaction chamber.

2. The gas-cooled nuclear reaction of claim 1 wherein the neutron absorbing substance is Thorium-232, the Thorium-232 concentration in the ball-shaped elements fed to the outer marginal zone being 20%–30% higher than in the ball-shaped elements fed to the rest of the reaction chamber.

3. The gas-cooled nuclear reactor of claim 1 wherein the neutron-absorbing substance is Plutonium-240, and said outer marginal zone is between 20 cm. and 40 cm. thick.

4. A method of operating a gas-cooled nuclear reactor, the reactor comprising:
   (a) a generally cylindrical container,
   (b) a layer of graphite approximately one meter in thickness lining the inside walls of the container and forming a ceiling reflector, a side reflector and a bottom reflector, the graphite reflectors encompassing a single reaction chamber,
   (c) means introducing a cooling gas through the ceiling reflector into the reaction chamber and withdrawing the gas from the reaction chamber through the bottom reflector for maintaining the reaction chamber at a desired operating temperature,
   (d) a first multitude of ball-shaped elements substantially filling the reaction chamber, the multitude of ball-shaped elements comprising an advantageous mixture of fissionable material, fertile material, and moderator material which will sustain a nuclear chain reaction,
   (e) a second multitude of ball-shaped elements containing a higher concentration of neutron absorbing substance than is contained by said first multitude of ball-shaped elements in the reaction chamber, said neutron absorbing substance being selected from the group consisting of; Boron, Gadolinium, Hafnium, Iron, Manganese, Nickel, Plutonium, and Thorium,
   (f) a plurality of passages through the ceiling reflector for introducing additional ball-shaped elements into the reaction chamber and at least óne passage through the bottom reflector for withdrawing ball-shaped elements from the reaction chamber and,
   (g) at least two sets of feeding means connected to said plurality of passages through the ceiling reflector for feeding said ball-shaped elements through the passages into the reaction chamber, a first of the two sets of feeding means being arranged to only feed said second multitude of ball-shaped elements to an outer marginal zone of the reaction chamber; the method comprising the steps of
      (i) introducing said second multitude of ball-shaped elements through the ceiling reflector,
      (ii) withdrawing the ball-shaped elements through the bottom reflector at such a rate as to maintain said nuclear chain reaction.

5. The method of claim 4 wherein the neutron absorbing substance is Thorium-232, the Thorium-232 concentration in the ball-shaped elements fed to the outer marginal zone being 20%–30% higher than ball-shaped elements fed to the rest of the reaction chamber.

6. The method of claim 4 wherein the neutron absorbing substance is Plutonium-240, and said outer marginal zone is between 20 cm. and 40 cm. thick.

7. The gas-cooled nuclear reactor of claim 1, wherein fissionable material content in the vicinity of the reflector walls is obtained by use of pure graphite balls in the vicinity of the walls together with the fuel elements of which fissionable material content corresponds to that of the fuel elements in the middle core region.

* * * * *